United States Patent
Passeri et al.

(10) Patent No.: US 8,356,688 B2
(45) Date of Patent: Jan. 22, 2013

(54) MULTIPLE-POSITION STEERING CONTROL DEVICE

(75) Inventors: Gianni Passeri, Virgilio (IT); Marco Mariani, Modena (IT); Marco Betti, Monte San Pietro (IT); Christopher J. Goodwin, Greenville, NC (US); Michael Curry, Greenville, NC (US)

(73) Assignee: NMHG Oregon, LLC, Fairview, OR (US)

( * ) Notice: Subject to any disclaimer, the term of this patent is extended or adjusted under 35 U.S.C. 154(b) by 0 days.

(21) Appl. No.: 13/477,964

(22) Filed: May 22, 2012

(65) Prior Publication Data

US 2012/0227533 A1 Sep. 13, 2012

Related U.S. Application Data

(63) Continuation of application No. 11/774,445, filed on Jul. 6, 2007.

(51) Int. Cl.
*B62D 1/02* (2006.01)

(52) U.S. Cl. ........................ 180/326; 180/329

(58) Field of Classification Search .................. 180/326, 180/330, 334, 329, 333, 321, 315, 332
See application file for complete search history.

(56) References Cited

U.S. PATENT DOCUMENTS

| | | | |
|---|---|---|---|
| 1,672,212 A | 6/1928 | Hale | |
| 3,195,913 A * | 7/1965 | Hallsworth | 280/775 |
| 3,465,841 A * | 9/1969 | Harshbarger et al. | 180/65.1 |
| 3,738,441 A * | 6/1973 | Kemner | 180/65.1 |
| 3,791,474 A * | 2/1974 | Stammen et al. | 180/332 |
| 3,937,294 A | 2/1976 | Haddock | |
| 4,702,520 A | 10/1987 | Whisler et al. | |
| 5,036,942 A | 8/1991 | Loewen | |
| 5,052,512 A * | 10/1991 | Pakosh et al. | 180/329 |
| 5,265,021 A * | 11/1993 | Avitan | 701/41 |
| 5,887,669 A | 3/1999 | Ostler et al. | |
| 5,890,562 A | 4/1999 | Bartels et al. | |
| 6,182,778 B1 | 2/2001 | Henshaw et al. | |
| 6,390,764 B1 | 5/2002 | Merlo et al. | |
| 6,564,906 B1 | 5/2003 | Haack et al. | |
| 6,679,349 B1 | 1/2004 | Pollish, Jr. | |
| 6,694,240 B1 | 2/2004 | Swick et al. | |
| 6,776,249 B2 * | 8/2004 | Fortin | 180/19.3 |
| 6,793,247 B2 | 9/2004 | Swetish | |
| 6,871,721 B2 | 3/2005 | Smiley et al. | |

(Continued)

FOREIGN PATENT DOCUMENTS

DE 10212623 10/2003
DE 10347925 5/2005

(Continued)

OTHER PUBLICATIONS

S01361156900 Manual Supplement; Model: H8.00-16.00XM-6; NAACO Materials Handling Group Pty Ltd; pp. 1-10; Jan. 2006.

(Continued)

*Primary Examiner* — Joseph Rocca
*Assistant Examiner* — Nicole Verley
(74) *Attorney, Agent, or Firm* — Stolowitz Ford Cowger LLP

(57) ABSTRACT

An industrial vehicle includes an operator compartment, a steering control device mounted for access from a first selectable operator position located outside of the operator compartment, and a steering column supporting the steering control device. The steering control device configured to rotate about the steering column and provide steering control from the operator compartment in a second selectable operator position opposite the first selectable operator position.

20 Claims, 6 Drawing Sheets

U.S. PATENT DOCUMENTS

| | | | |
|---|---|---|---|
| 6,883,625 B2 | 4/2005 | Trego et al. | |
| 6,955,239 B2 | 10/2005 | Ueda et al. | |
| 6,962,231 B2 | 11/2005 | Carlsson et al. | |
| 6,971,194 B2 | 12/2005 | McClelland et al. | |
| 6,971,470 B2 | 12/2005 | McGoldrick | |
| 7,025,157 B2 | 4/2006 | Lindsay et al. | |
| 7,051,832 B2 | 5/2006 | Lewis et al. | |
| 7,121,608 B2 * | 10/2006 | Billger et al. | 296/65.06 |
| 7,142,963 B2 | 11/2006 | Borroni-Bird et al. | |
| 7,159,687 B2 * | 1/2007 | Dunn et al. | 180/329 |
| 7,353,099 B2 * | 4/2008 | Lindsay et al. | 701/50 |
| 7,428,943 B2 | 9/2008 | Smiley et al. | |
| 7,441,625 B2 * | 10/2008 | Ackermann | 180/326 |
| 7,484,587 B2 | 2/2009 | Portscheller et al. | |
| 7,496,441 B2 | 2/2009 | Brandt et al. | |
| 7,537,074 B2 | 5/2009 | Ishii et al. | |
| 7,726,745 B2 | 6/2010 | Bruns et al. | |
| 7,772,969 B2 | 8/2010 | Prohaska | |
| 7,775,317 B1 | 8/2010 | Goodwin et al. | |
| 7,784,581 B1 | 8/2010 | Klas et al. | |
| 7,849,951 B2 | 12/2010 | Borchers et al. | |
| 7,854,291 B2 | 12/2010 | Akahane et al. | |
| 7,870,919 B2 | 1/2011 | Waltz et al. | |
| 2003/0127272 A1 * | 7/2003 | Baker et al. | 180/326 |
| 2004/0144590 A1 | 7/2004 | Fluent et al. | |
| 2005/0023070 A1 | 2/2005 | Smiley et al. | |
| 2005/0045409 A1 | 3/2005 | Fenelli et al. | |
| 2006/0137931 A1 | 6/2006 | Berg et al. | |
| 2006/0207822 A1 | 9/2006 | Taylor | |
| 2007/0074924 A1 | 4/2007 | Schonauer et al. | |
| 2007/0119647 A1 | 5/2007 | Kusunoki | |
| 2007/0295551 A1 | 12/2007 | Proud et al. | |
| 2008/0047245 A1 * | 2/2008 | MacGregor et al. | 56/10.8 |
| 2009/0012677 A1 | 1/2009 | Passeri et al. | |
| 2009/0222167 A1 | 9/2009 | Goodwin et al. | |
| 2009/0223734 A1 | 9/2009 | Frett et al. | |

FOREIGN PATENT DOCUMENTS

| | | |
|---|---|---|
| GB | 2008065 | 5/1975 |
| WO | 2006113510 | 10/2006 |

OTHER PUBLICATIONS

International Search Report and Written Opinion of International Application No. PCT/US08/069253, dated Oct. 16, 2008.

International Preliminary Examination Report, mailed Jan. 12, 2010; PCT Application No. PCT/US08/069253, filed Oct. 16, 2008; 9 pages.

European Patent Office; "Communication Pursuant to Article 94(3) EPC"; European Patent Application No. 08796101.7; dated Feb. 22, 2011; 4 pages.

Stolowitz Ford Cowger LLP, "Listing of Related Cases"; Jun. 4, 2012; 2 pages.

European Patent Office: "Communication Pursuant to Article 94(3) EPC"; European Patent Application No. 08796101.7; dated Mar. 5, 2012; 5 pages.

* cited by examiner

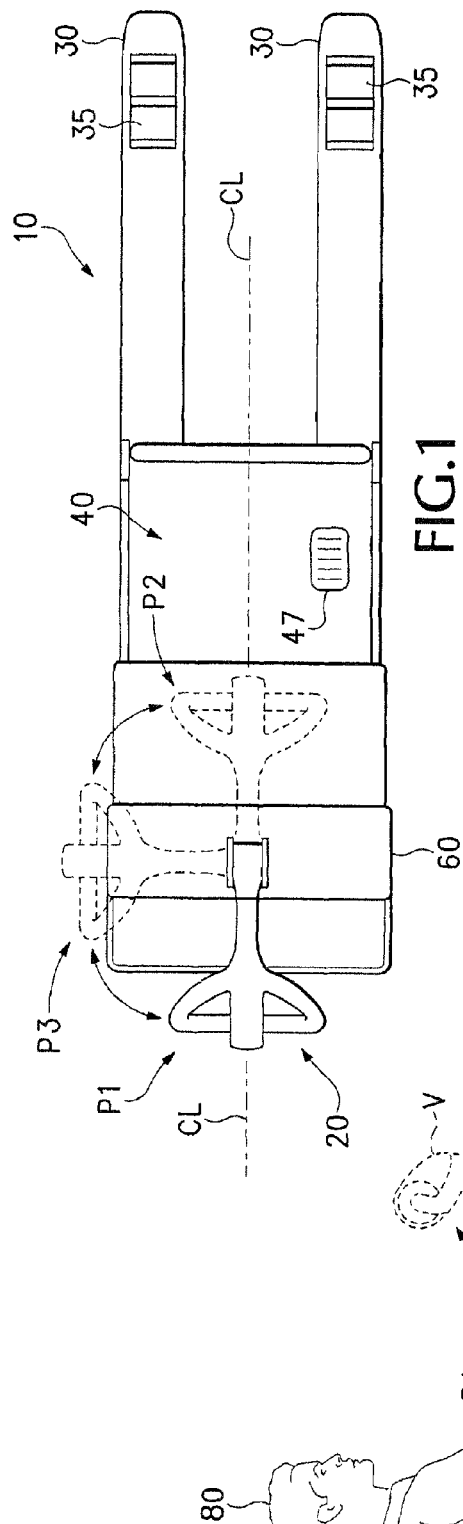
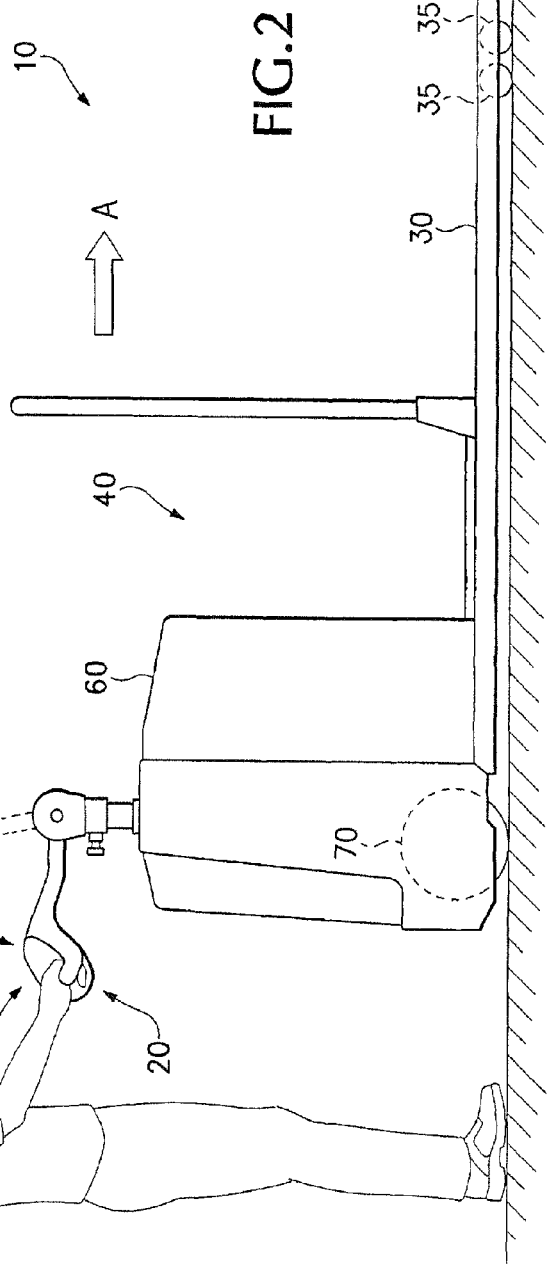
FIG.1
FIG.2

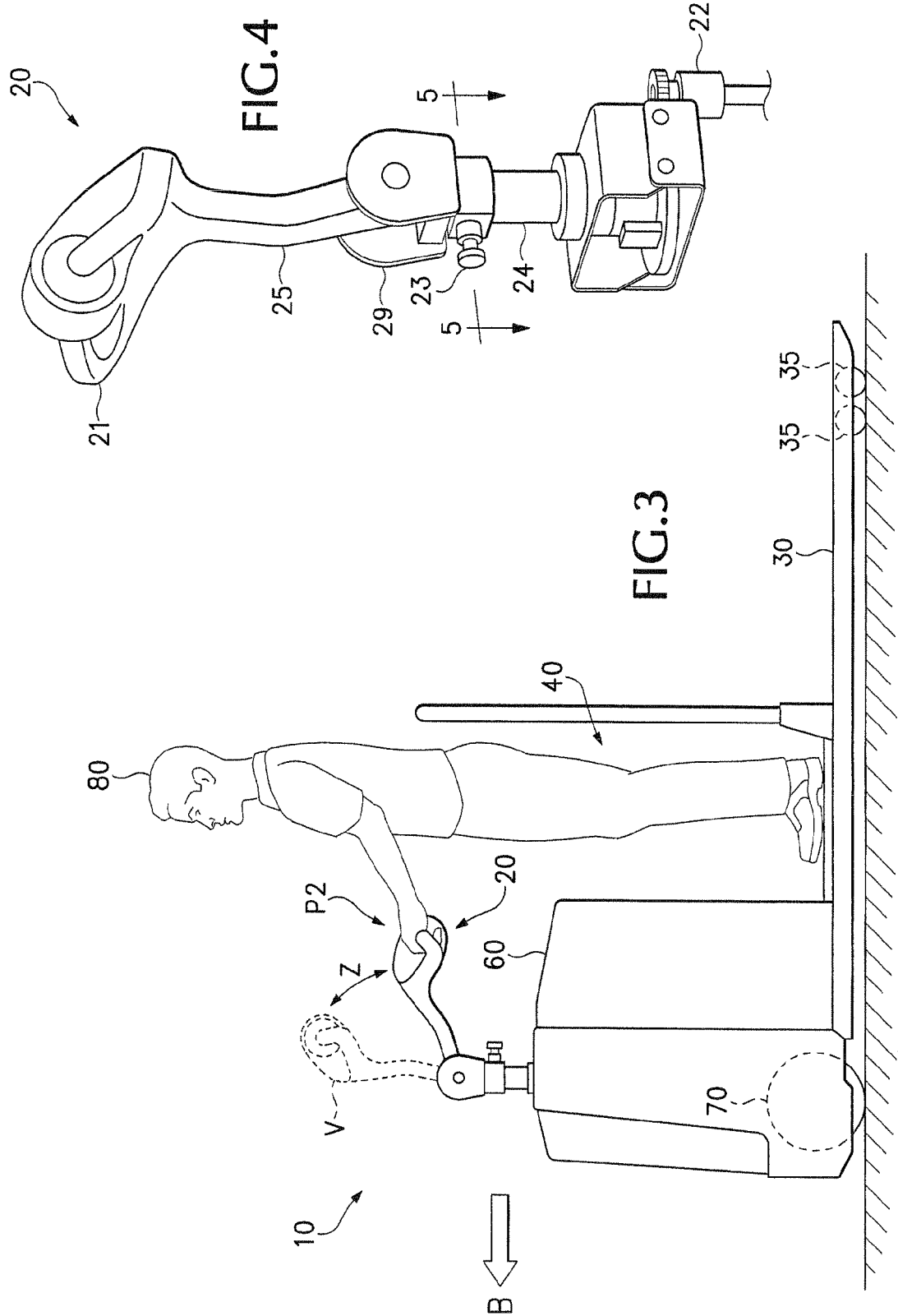

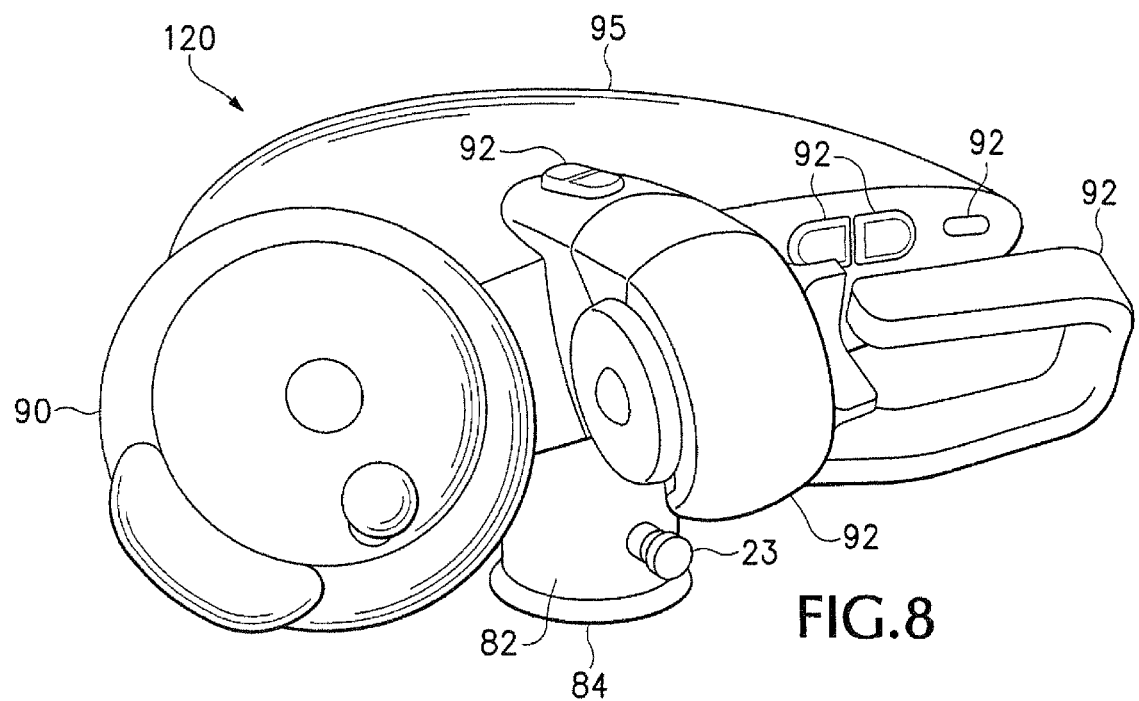

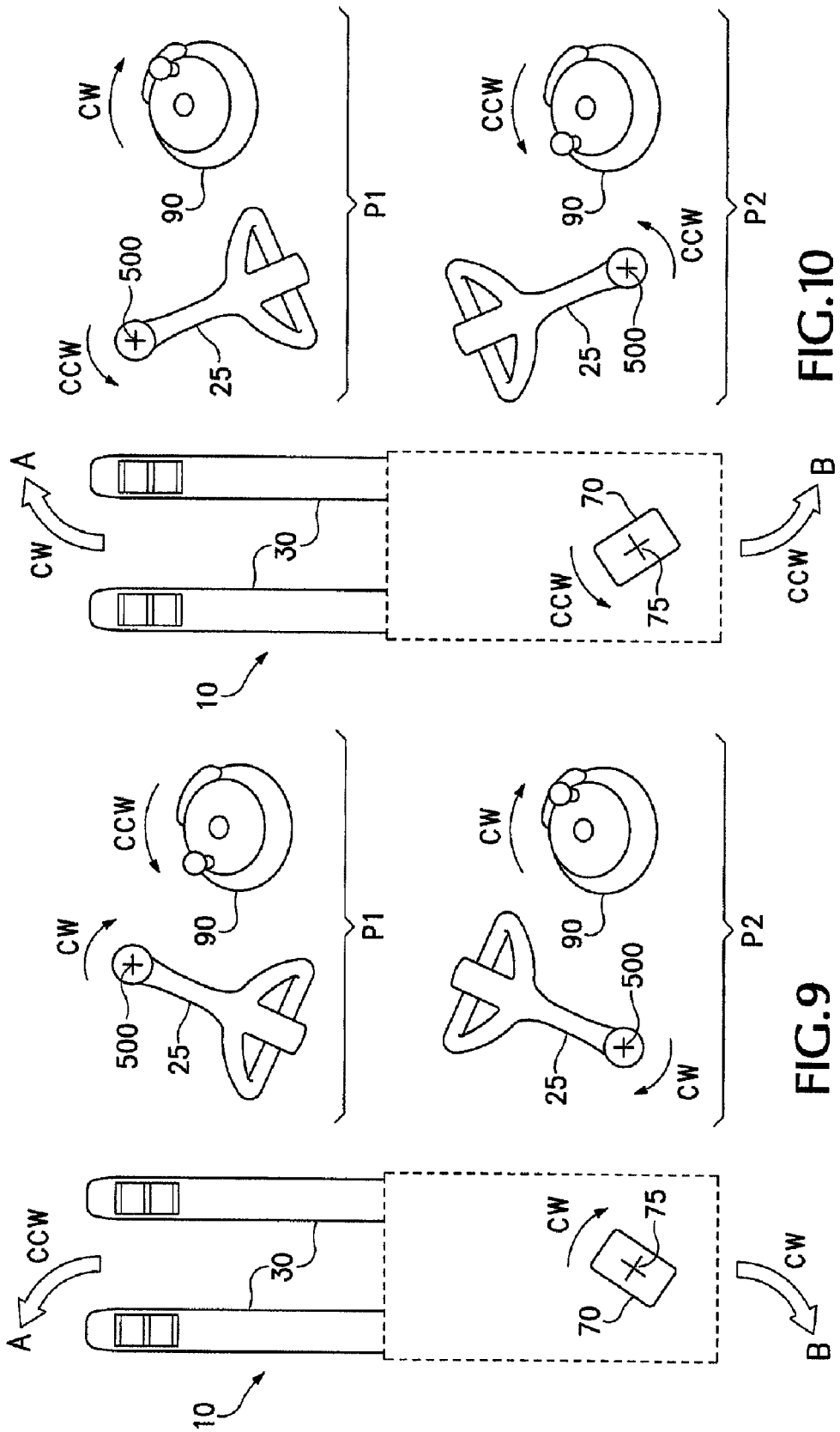

MULTIPLE-POSITION STEERING CONTROL DEVICE

RELATED APPLICATIONS

This application claims priority to, and is a continuation of, U.S. patent application Ser. No. 11/774,445, filed on Jul. 6, 2007, which is herein incorporated by reference in its entirety.

BACKGROUND

An industrial vehicle such as a forklift truck, is utilized to lift and transport loads between locations. Some motorized vehicles known in the art provide for vehicle operation from an operator compartment onboard the vehicle. Other vehicles, such as pallet trucks, provide for vehicle operation from an operator position off-board the vehicle such as with the operator walking at one end of the vehicle. Still other vehicles known in the art provide for vehicle operation from a left-hand or right-hand side of the vehicle.

Depending on the operating position, some vehicles may be better suited for particular applications than others. For example, where operating space is limited, vehicle traffic is heavy, or when traveling over long distances, vehicles that provide an onboard operator position may be used. In other applications that require the operator to temporarily or frequently leave the vehicle, it may be preferable to use vehicles that are operated by a walking operator. Providing for these multiple applications result in a fleet of different vehicles, including corresponding maintenance costs and operator training requirements.

An operator of a vehicle is often required to move the vehicle in either a forward or reverse direction, with the forward direction understood as being the direction the operator is primarily facing in a normal operating position. When traveling in a reverse direction, the operator may look over their shoulder. The operator may instead decide to turn around and hold an operating control with an opposite hand or behind their back when traveling in the reverse direction. Switching hands, turning around, or even looking over the shoulder can make it difficult to remember which direction a control is to be rotated, pivoted or otherwise controlled when operating a vehicle in the forward and reverse directions.

The present invention addresses these and other problems.

SUMMARY OF THE INVENTION

A steering apparatus for controlling a motorized vehicle is herein disclosed as including a mounting structure attached to the vehicle and a tiller arm pivotably connected to the mounting structure so as to provide a full range of steering control from a first operator position on one side of the mounting structure. The tiller arm is configured to be rotated to an opposite side of the mounting structure and provide the full range of steering control from a second operator position located on the vehicle.

A steering system is herein disclosed as including a steered tire and a steering control device that controls the steered tire from a first operating position. The steering system further includes a steering control mount that supports the steering control device and is configured to allow the steering control device to rotate to a second operating position opposite the first operating position. An interlock is operable to disable the steering control device as it rotates between the first and second operating positions.

An industrial vehicle is herein disclosed as including an operator compartment, a steering control device mounted for access from a first selectable operator position located outside of the operator compartment, and a steering column supporting the steering control device. The steering control device configured to rotate about the steering column and provide steering control from the operator compartment in a second selectable operator position opposite the first selectable operator position.

A method is herein disclosed that includes detecting a position of a steering control that is configured to provide a steering function of a vehicle in either of a first operating position or a second operating position, where the first operating position is oriented opposite that of the second operating position. The method further includes receiving an interlock signal and enabling the steering and a traction function when the interlock signal indicates that the position of the steering control is in the first or second operator position. The steering function is disabled when the interlock signal indicates that the position of the steering control is not an operating position.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 illustrates a vehicle with a steering control device configured to be operable in multiple positions.

FIG. 2 illustrates the vehicle of FIG. 1 with the steering control device oriented in a walking position.

FIG. 3 illustrates the vehicle of FIG. 1 with the steering control device oriented in a rider position.

FIG. 4 illustrates an example steering control device with rotating tiller arm.

FIG. 8 illustrates an enlarged view of the multiple-position steering control device of FIG. 7.

FIG. 9 illustrates an example method of steering a vehicle in a forward and reverse direction.

FIG. 10 illustrates an example of a further method of steering a vehicle in a forward and reverse direction.

DETAILED DESCRIPTION

Figure 5:
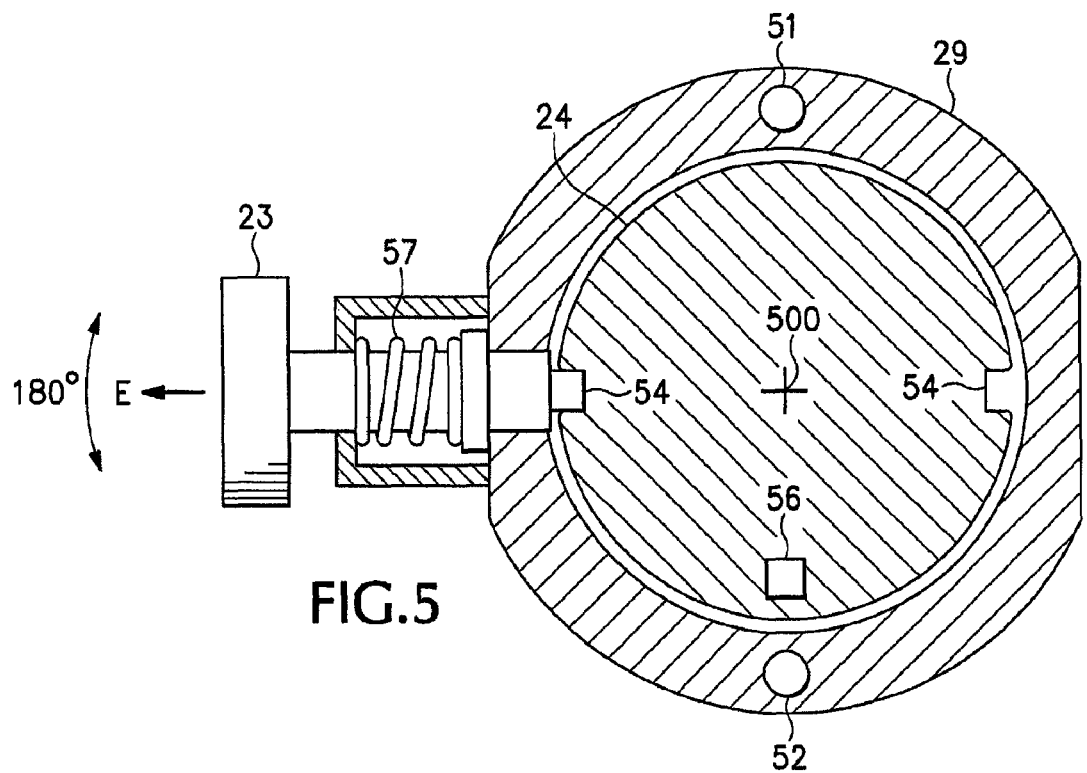
FIG. 5 illustrates a cross-sectional view of the steering control device of FIG. 4.

FIG. 1 illustrates a vehicle 10, such as a pallet truck, industrial vehicle or other transportation device. The vehicle 10 includes a steering control device 20 configured to be operable in multiple positions, such as P1 and P2. The steering control device 20 is shown as including a tiller arm that may be used both for turning and braking the vehicle 10. In other embodiments, the steering control device 20 may include a joystick, lever, steering wheel, switch, pedals, or other type of steering control device known in the art. The steering control device 20 may operate the vehicle 10 through a mechanical linkage, mechanical connection, electrical signals, wireless communication, or via a drive-by-wire system. The vehicle 10 may include motorized traction control so as to provide for a motorized vehicle.

The vehicle 10 is shown as including forks 30 having load wheels 35. A load may be placed on the forks 30 during transportation. The vehicle is further shown as including an operator compartment 40 and a mounting structure 60 for mounting the steering control device 20. The mounting structure 60 may be attached to the vehicle 10 and may include a compartment for housing a traction motor for providing traction control of the vehicle 10.

The steering control device 20 may be operated to control a motorized vehicle, such as vehicle 10. The steering control device 20 may be connected to the mounting structure 60 so as to provide a full range of steering control from a first operator position P1 on one side of the mounting structure 60. In one embodiment, the steering control device is configured to be rotated to an opposite side of the mounting structure 60 and provide the full range of steering control from a second operator position P2 located on the vehicle 10. In one embodiment, the second operator position P2 is located in the operator compartment 40.

The vehicle 10 may include an interlock mechanism that allows the steering control device 20 to be rotated between the first and second operator positions P1 and P2. In one embodiment, the steering control device 20 may be operated or enabled in either the first or second operator positions P1, P2 but not in a third operator position P3. The third, intermediate operating position P3 may be understood as being a condition in which the steering control device 20 is not engaged or locked in either the first or second operator position P1, P2 and in which the operation of the steering control device 20 is disabled. Operation of the steering control device 20 may be temporarily disabled while being rotated between the first and second operator positions P1 and P2.

In one embodiment, the steering control device 20 is configured to provide a neutral steering position on either side of the mounting structure 60. The neutral steering position may be identified with an orientation of the steering control device 20, such as a tiller arm, being aligned along a longitudinal centerline CL of the vehicle 10. The neutral steering position may be understood by the first position P1 of the steering control device 20 in FIG. 1 as well as the dashed image of the steering control device at position P2.

The steering control device 20 may be configured to rotate clockwise and counterclockwise by an operator located in either the first or second operator positions P1 and P2 without the steering control device 20 understood as being in the third operator position P3. A rotation of the engaged steering control device 20 provides for steering control of the vehicle 10. The steering control device 20 may be understood as being in either the first or second operator positions P1, P2 when the steering control device is enabled, and is understood as being in the third operator positions P3 when disabled.

In one embodiment, the steering control device 20 is operable or enabled at any of the first, second or third operator positions P1, P2, P3, and is inoperable or disabled when rotated between any of these positions. More or fewer operating positions may be provided, for example a fourth operator position may be configured that is located on a side of the mounting structure 60 opposite the third operator position P3. Either operator position P1 or P3 may provide for an operator to control the vehicle 10 while walking approximately along the centerline CL or to either side of the vehicle 10, respectively. An operator presence 47 may be provided in the operator compartment 40 to detect a presence of an operator. The operator presence 47 may include a switch, pedal, control or sensor that an operator steps on, for example.

FIG. 2 illustrates the vehicle 10 with the steering control device 20 oriented in an off-board or walking position, corresponding to the first operator position P1 of FIG. 1. The first operator position P1 may be understood as allowing the operator 80 to walk behind or in front of the vehicle 10, depending on which direction the operator 80 is facing. With the operator 80 facing a direction A, the vehicle 10 moves forward in the same direction A that the operator 80 is facing, and reverse in an opposite direction of travel. The first operator position P1 is shown on a side of the mounting structure 60 opposite the operator compartment 40.

An approximately vertical position V of the steering control device 20 may provide for braking of the vehicle 10. The steering control device 20 may include a deadman brake mechanism which urges the steering control device 20 to the vertical braking position 20. The operator 80 may rotate the steering control device 20 in a downward arc Y through a range of operating positions. At the bottom of the downward arc Y, the steering control arm 20 may be placed in an approximately horizontal braking position, which may be selected for braking the vehicle 10. In one embodiment, the steering control device 20 may be pivoted down and away from the operator compartment 40 in the first operator position P1.

The steering control device 20 may be controlled by the operator to steer the vehicle 10. The steering control device 20 may be connected to, or send commands to move one or more steered tires such as steered tire 70 in order to steer the vehicle 10. The steering control device 20 may include mechanical linkage to the steered tire 70 or may send commands via an electronic steering system that may not include any direct mechanical linkage.

FIG. 3 illustrates the vehicle of FIG. 1 with the steering control device 20 oriented in an onboard or rider position, corresponding to the second operator position P2 of FIG. 1. The second operator position P2 may be understood as allowing the operator 80 to ride on the vehicle 10. With the operator 80 facing a direction B, the vehicle 10 moves forward in the same direction B that the operator 80 is facing, and reverse in an opposite direction of travel. The second operator position P2 may therefore be associated with the operator 80 riding on the vehicle 10.

An approximately vertical position V of the steering control device 20 may provide for braking of the vehicle 10. The steering control device 20 may include a deadman brake mechanism which urges the steering control device 20 to the vertical braking position 20. The operator 80 may rotate the steering control device 20 in a downward arc Y through a range of operating positions. At the bottom of the downward arc Y, the steering control arm 20 may be placed in an approximately horizontal braking position, which may be selected for braking the vehicle 10. In one embodiment, the steering control device 20 may be pivoted down and away from the operator compartment 40 in the first operator position P1.

Both the first and second operator positions P1, P2 may be understood as being substantially aligned along the longitudinal centerline CL of the vehicle 10 (reference FIG. 1). The first operator position P1 may be associated with a forward direction A of vehicle travel facing the vehicle fork 30. The second operator position P2 may be associated with a forward direction of travel B opposite the vehicle fork 30.

The operator 80 may rotate the steering control device 20 in a downward arc Z through a range of operating positions. At the bottom of the downward arc Z, the steering control arm 20 may be placed in an approximately horizontal braking position, which may be selected for braking the vehicle 10. In one embodiment, the steering control device 20 may be pivoted down and towards the operator compartment 40 in the second operator position P2. The downward arc Z may include a same approximate range of motions as the downward arc Y of FIG. 2.

In one embodiment, the downward arc Y is a greater angle than downward arc Z, such that a horizontal braking position of the steering control device 20 is reached at a smaller angle of rotation with respect to the vertical position V. The operator 80 who is riding the vehicle 10 may be at an elevated height at operator position P2 with respect to the same operator 80 who is walking at operator position P1. By providing different respective horizontal braking positions according to the amount of vertical rotation of the steering control device 20 in the first and second operator positions P1, P2 this may provide for improved ergonomic control for the operator 80 when walking or riding the vehicle 10. The angles of rotation associated with arcs Y and Z may be configurable or programmable according to an operator preference or particular application.

A steering system is therefore disclosed as including the steered tire 70 and the steering control device 20 that controls the steered tire 70 from the first operating position P1. The steering system further includes the steering control mount 60 that supports the steering control device 20 and is configured to allow the steering control device 20 to rotate to a second operating position P2 opposite the first operating position P1. The system may be configured such that the steered tire 70 does not turn as the steering control device 20 is rotated between the first and second operating positions P1, P2.

FIG. 4 illustrates an example steering control device 20 with a rotating tiller arm 25. The rotating tiller arm 25 is shown as including a tiller head 21 at a first end, and as being pivotably attached to a tiller arm support 29 at a second end. The tiller head 21 may include one or more operating controls such as throttle, lift, lower, horn, coast control, creep speed, emergency reversing switch, auxiliary functions, etc. . . . The tiller arm 25 may be pivoted in a vertical orientation with respect to the tiller arm support 29, thereby allowing the operator to rotate the tiller arm 25 through the downward arcs Y or Z of FIGS. 2 and 3, respectively. The tiller arm support 29 may be connected to a steering column 24, such that the tiller arm 25 and steering column 24 may turn in unity when the operator 80 rotates the steering control device 20 in a horizontal orientation.

The steer column 24 is shown as being connected to a mechanical linkage 22 which operates to transmit the rotation of the steering column 24 to a rotation or turning of the steered tire 70 of FIGS. 2 and 3. The operation of the mechanical linkage 22 and associated gears to turn the steered tire 70 is well known in the art and is not described further herein.

The steering control device 20 may be mounted in an industrial vehicle, such as vehicle 10 of FIG. 1 for access from a first selectable operator position P1 located outside of the operator compartment 40. The steering column 24 supports the steering control device 20. The steering control device 20 is configured to rotate about the steering column 24 and provide steering control from the operator compartment 40 in a second selectable operator position P2 opposite the first selectable operator position P1. The steering control device 20 allows for a full range of steering control of the tiller arm 25 for onboard operation such as from operator position P2, as well as off-board operation such as from operator position P1.

FIG. 5 illustrates a cross-sectional view of the steering control device 20 of FIG. 4, taken through the tiller arm support 29 and steering column 24. A locking pin 23 may be provided as the interlock that operates to enable and disable a control of the steering control device 20. The locking pin 23 is shown as being mounted to the tiller arm support 29. If the locking pin 23 is extended or pulled out and away from the tiller arm support 29 in the direction E, the tiller arm 25 and tiller arm support 29 are able to rotate about the steering column 24 without causing the steering column 24 to also rotate. With the locking pin 23 pulled out, the operator 80 of FIGS. 2 and 3 is able to freely rotate the tiller arm 25 between the first position P1 and the second position P2 as shown in FIG. 1. The locking pin 23 may be pulled out in direction E by the operator 80 without the use of any tools.

The steering column 24 may include one or more detents 54 that engages the locking pin 23 when it is in a released position (as shown in FIG. 5). The tiller arm support 29 is engaged with the steering column 24 when the locking pin 23 is locked in one of the detents 54 associated with operator positions P1 or P2 of FIG. 1. In one embodiment, the steering column 24 includes additional detents that would provide for further operator positions that result in the tiller arm support 29 and steering column 24 engaging in positions other than P1 and P2. This would enable the steering control device 20 to be engaged, and operable, in the third operator position P3 for example.

One or more sensors such as sensors 51, 52 of FIG. 5 may be provided to determine a relative position of the tiller arm support 29 with respect to the steering column 24. The first sensor 51 may identify an index point 56 of the steering column 24 that is aligned with or of sufficient proximity to the first sensor 51 to indicate that the steering control device 20 may be operable in a first operator position P1. A second sensor 52 may identify an index point on the steering column 24 that is aligned with or of sufficient proximity to the second sensor 52 to indicate that the steering control device 20 may be operable in a second operator position P2. The first and second sensors 51, 52 may be configured to indicate the operability of the steering control device 20 as coinciding with the engagement of the tiller arm support 29 and the steering column 24, or of the locking device 23 with one of the detents 54.

In one embodiment, the tiller arm 25 of FIG. 4 may be rotated about the steering column 24 by 180 degrees, lock to lock. The locking pin 23 may be spring biased towards a locked position by a spring device 57, such that the tiller arm support 29 and steering column 24 are automatically engaged when the tiller arm 25 is placed in either of the first or second operator positions P1, P2. When the tiller arm support 29 and the steering column 24 are engaged, the steering control device 20 is enabled, a rotation of the tiller arm 25 causes a corresponding rotation of the steering column 24 about a central axis of rotation 500. In one embodiment, the tiller arm support 29 is considered to include the locking pin 23, the first and second sensors 51, 52 and the spring device 57, all of which may rotate about the steering column 24 in unison.

Figure 6:
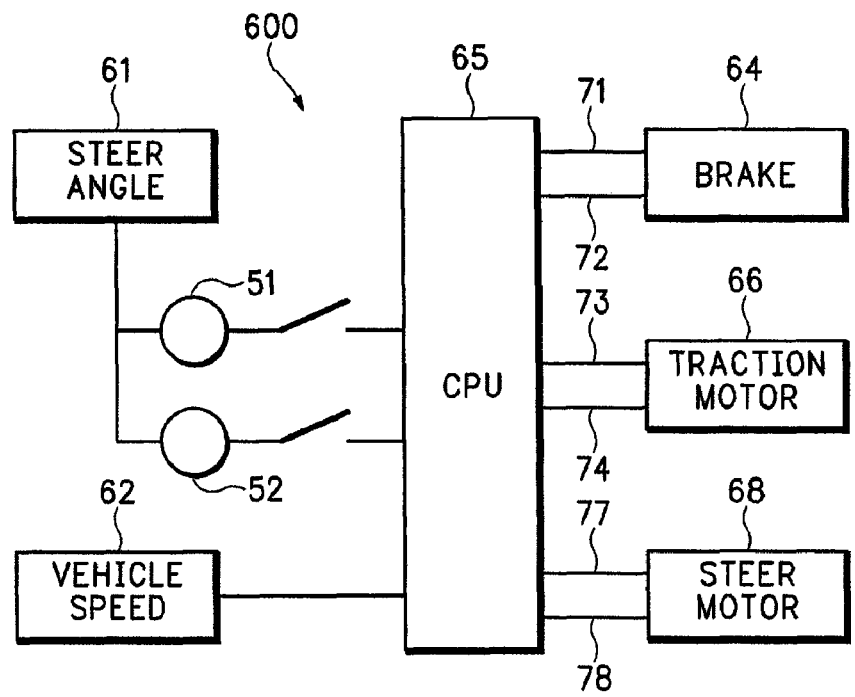
FIG. 6 illustrates an example circuit diagram of a steering control system including configurable operating parameters.

FIG. 6 illustrates an example circuit diagram of a steering control system 600 including configurable operating parameters. The system 600 may be provided with a steer angle sensor 61 and a vehicle speed sensor 62 known in the art. The steer angle sensor 61 may be configured to identify or provide information related to a commanded steering angle from the steering control device 20 or a vertical angle of the steering control device (such as arcs Y or Z of FIG. 2 or 3). The steer angle sensor 61 may further be configured to identify or provide information related to an input steer effort or a rate of change of steering angle of the steering control device 20. Steer angle sensor 61 may include a torque sensing device such as a potentiometer, which may be mounted on the steering column 24, and which may further work in conjunction with a spring lever arm arrangement to measure the input steer effort. A controller or processor such as CPU 65 may receive input from one or both sensors 61, 62. In one embodiment, the input from the steer angle sensor 61 is associated with a signal from one of the first or second sensors 51, 52 of FIG. 5. Based on the input from one or more of the sensors 51,

52, 61, 62, the CPU 65 may determine to vary one or more functions related to a vehicle brake 64, a traction motor 66 or a steer motor 68.

For example, the CPU 65 may send a braking signal 71 to the brake 64 corresponding to the pivot angle associated with the arc Y FIG. 2 according to a selection of the first operator position P1 and the associated input from the first sensor 51. The CPU 65 may send a braking signal 72 to the brake 64 corresponding to the pivot angle associated with the arc Z from FIG. 3 according to a selection of the second operator position P2 and the associated input from the second sensor 52.

In one embodiment, a maximum travel speed of the vehicle 10 may be made to vary according to a selection of the first or second operator positions P1, P2 and the associated inputs from the first or second sensors 51, 52. A normal speed signal 73 may be sent to the traction motor 66 when the CPU 65 receives input from the first sensor 51, whereas a high speed signal 74 may be commanded when the CPU 65 receives input from the second sensor 52. A maximum travel speed of the vehicle may be limited for operator positions associated with a walking operator. If the CPU 65 does not receive any input from either sensor 51, 52, then it may disable the traction motor 66.

In other embodiment, the input from one or more of the sensors 51, 52, 61, 62 may be used to vary a vehicle speed of the traction motor 66 during a cornering of the vehicle 10 (according to an amount of steer angle input) or depending on the rate of change of the steering angle. In still other embodiments, the inputs from one or more of the sensors 51, 52, 61, 62 may be used by the CPU 65 to determine how much steering force should be provided by the steer motor 68. The steer motor 68 may provide power assisted steering for the steering control device 20 of FIG. 1. Commands sent from the CPU 65 to the brake 64, traction motor 66 and steer motor 68 may be programmable and configurable according to operator preference, safety regulations, or particular applications.

Figure 7A:
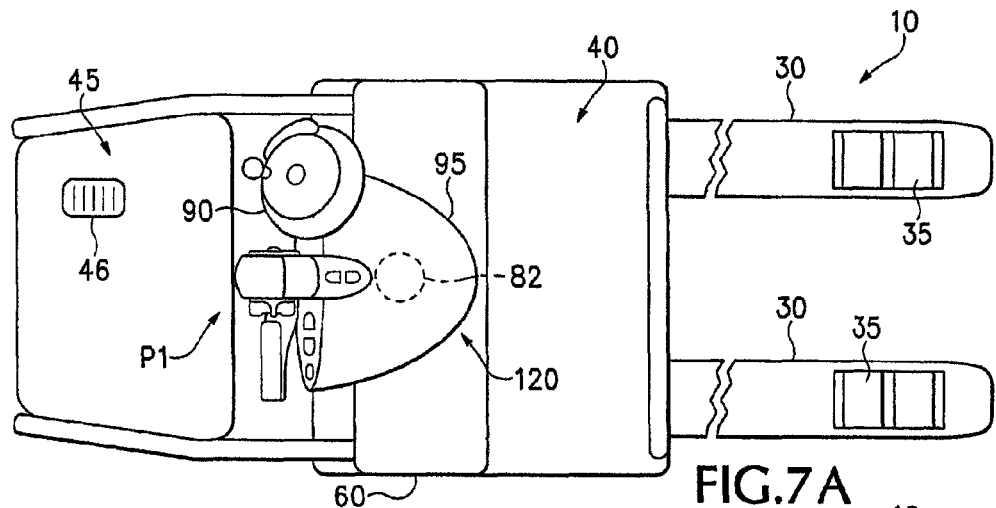
FIGS. 7A-C illustrate a vehicle with a multiple-position steering control device including a steering wheel.
Figure 7B:
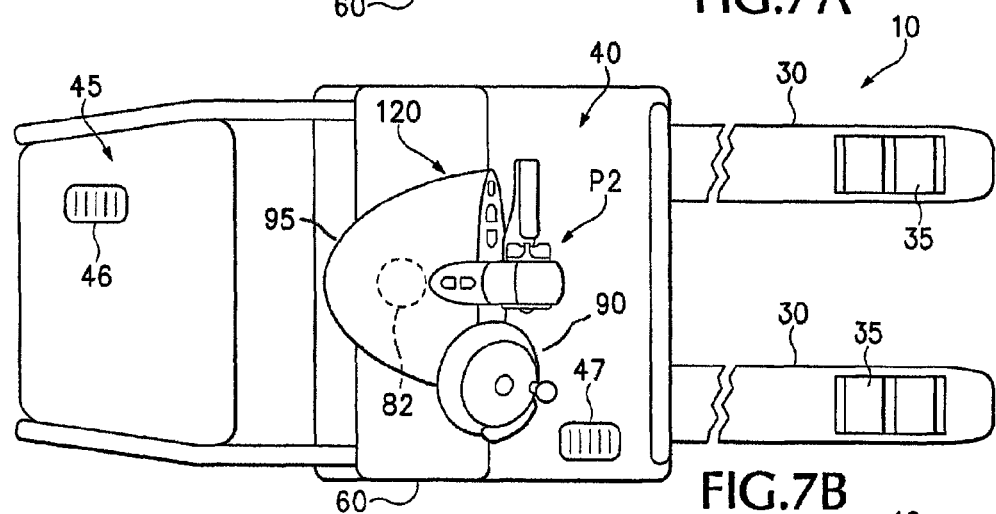
Figure 7C:
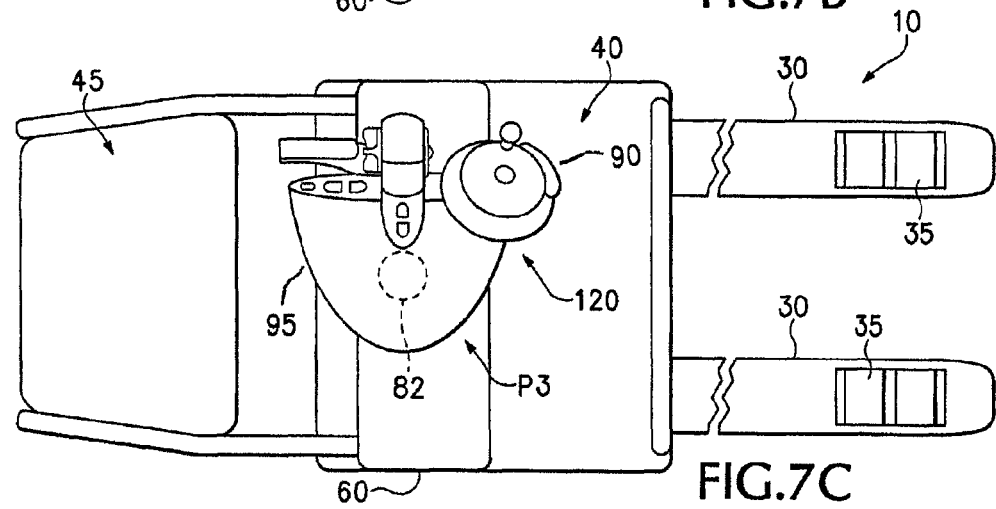

FIGS. 7A-C illustrate a vehicle 10 with a multiple-position steering control device 120 including a steering wheel 90. The multiple-position steering control device 120 may include a control housing 95 with multiple controls. The multiple-position steering control device 120 may be configured to rotate to multiple positions, similar to the steering control device 20 of FIG. 1, and as identified by first position P1 on FIG. 7A and second position P2 on FIG. 7B. An orientation of the second operator position P2 may be opposite that of the first operator position P1. A support column 82, shown in dashed lines, may be used to support the multiple-position steering control device 120, and provide a means of rotation between the multiple operator positions.

The first operator position P1 may be associated with an operator that is operating the vehicle 10 from a first side of the mounting structure 60, such as operator 80 of FIG. 2. The second operator position P2 may be associated with an operator that is operating the vehicle from a second side of the mounting structure 60, such as operator 80 of FIG. 3. The second operator position P2 may provide for operation of the vehicle 10 from the operator compartment 40. In one embodiment, an operator platform 45 may be provided at an end of the vehicle opposite the forks 30 that allows the operator to ride on the operator platform 45 when operating the vehicle 10 from the first operator position P1. The operator may therefore be able to ride on the vehicle 10 from either operator position P1 or P2.

In one embodiment, a third operator position P3 shown in FIG. 7C may be provided intermediate operator positions P1, P2 that provide control of the vehicle 10 from either the left or right side. An operator may operate the vehicle 10 while walking alongside the vehicle 10. In another embodiment, the steering is inoperable while multiple-position steering control device 120 is being rotated between the first and second operator positions P1, P2 or is in an intermediate operator position P3 between operator positions P1 and P2.

In yet a further embodiment, an operator presence mechanism may be provided to identify the location of the operator 80. For example, a first operator presence 46 may be associated with the operator platform 45 to locate an operator operating the multiple-position steering control device 120 in position P1. A second operator presence 47 may be associated with the operator compartment 40 to locate an operator operating the multiple-position steering control device 120 in position P2. The operator presence 46, 47 may include a switch, pedal, control or sensor provided in a floor of the operator platform 45 and the operator compartment 40.

The CPU 65 of FIG. 6 might determine to deactivate the multiple-position steering control device 120 when the operator presence 46, 47 corresponding with the operator position P1, P2 does not detect the presence of an operator. For example, if the CPU 65 detects the multiple-position steering control device 120 is in operator position P1 and operator presence 47 detects the presence of the operator, the CPU 65 may deactivate one or more of the vehicle operations 64, 66, 68 of FIG. 6. An orientation of the operator 80 according to a corresponding position of the multiple-position steering control device 120 may thereby be monitored and controlled.

FIG. 8 illustrates an enlarged view of the multiple-position steering control device 120 of FIGS. 7A-C, shown in isolation from the rest of the vehicle 10. The control housing 95 including the steering wheel 90 is shown connected to support column 82. The support column 82 is rotatably connected to a control mount 84, which in turn is connected to the mounting structure 60 of FIG. 7. The support column 82 and control mount 84 may be provided with an interlock 23, as well as one or more sensors similar to sensors 51, 52 of FIG. 5. The multiple-position steering control device 120, including steering wheel 90 may provide electronic steering of the vehicle 10, also known as drive-by-wire. There may not be any direct mechanical linkage provided between the steering wheel 90 and a steered tire, such as steered tire 70 of FIGS. 2 and 3.

The multiple-position steering control device 120 may control a steer angle of the steered tire 70 via electronic control and an electric steer motor, such as steer motor 68 of FIG. 6. Referring further to FIG. 6, a steer angle sensor 61 associated with the steering wheel 90 may be used to provide input to a CPU 65 in order to control operating parameters of the vehicle 10 of FIG. 7. The CPU 65 may command the steer motor 68 to turn the vehicle 10 in different directions given the same input from steer angle sensor 61 based on the further input from the first or second sensors 51, 52. The CPU 65 may send a normal steering signal 77 (see FIG. 6) to the steer motor 68 when it receives input from the first sensor 51 in combination with input from the steer angle sensor 61. The CPU may send a reverse steering signal 78 when it receives input from the second sensor 52 in combination with input from the steer angle sensor 61. In one embodiment, a rotational steering sense of the steering wheel 90 in the first operating position P1 is reversed as compared with a rotational steering sense of the steering wheel 90 in the second operating position P2.

Multiple-position steering control device 120 may include, but is not limited to, numerous other controls 92 such as throttle, lift, lower, horn, coast control, creep speed, emergency reversing switch, auxiliary functions and hand sensing for the operation of the vehicle 10 of FIG. 7.

FIG. 9 illustrates an example method of steering the vehicle 10 of either FIG. 1 or FIG. 7 in a forward and reverse direction. Steering control devices 20, 120 including the tiller arm 25 or the steering wheel 90 are shown with respect to the first and second operator positions P1, P2. The vehicle 10 is shown in phantom lines in order to more clearly illustrate the relationship between control of the steering control device 20, 120 and the operation of the steered tire 70. The steered tire 70 is shown as being rotated in a clockwise (CW) direction with respect to a vertical axis of rotation 75. When the vehicle 10 shown in FIG. 9 travels in a fork-first direction A, it turns in a counterclockwise (CCW) manner. When the vehicle 10 shown in FIG. 9 travels in an opposite direction B, it turns in a clockwise manner.

Considering a first case of FIG. 9, where the steering control device 20, 120 is located in a first operator position P1 and the vehicle is traveling in a forward direction indicated as direction A (also see FIG. 2). Rotating the tiller arm 25 of FIG. 1 in a clockwise direction with respect to the central axis of rotation 500 of FIG. 5 causes the steered tire 70 to rotate in the clockwise direction about the vertical axis 75. Whereas rotating the steering wheel 90 of FIG. 7 in the counterclockwise direction causes the steered tire 70 to rotate in the clockwise direction. While moving in the forward direction A, the counterclockwise rotation of the steering wheel 90 results in a counterclockwise turn (to the left, with the operator facing towards direction A) of the vehicle 10.

Considering a second case of FIG. 9, where the steering control device 20, 120 is located in a second operator position P2 and the vehicle is traveling in a forward direction indicated as direction B (also see FIG. 3). Rotating the tiller arm 25 in a clockwise direction with respect to the central axis of rotation 500 of FIG. 5 causes the steered tire 70 to rotate in the clockwise direction about the vertical axis 75. The steering wheel 90 is also rotated in the clockwise direction to cause the steered tire 70 to rotate in the clockwise direction. While moving in the forward direction B, the clockwise rotation of the steering wheel 90 results in a clockwise turn (to the right, with the operator facing towards direction B) of the vehicle 10.

FIG. 10 illustrates an example of a further method of steering a vehicle in a forward and reverse direction. The steered tire 70 is shown as being turned in a counterclockwise direction with respect to a vertical axis of rotation 75. When the vehicle 10 shown in FIG. 10 travels in fork-first direction A, it turns in a clockwise manner. When the vehicle 10 shown in FIG. 10 travels in an opposite direction B, it turns in a counterclockwise manner.

Considering a first case of FIG. 10, where the steering control device 20, 120 is located in a first operator position P1 and the vehicle is traveling in a forward direction indicated as direction A (also see FIG. 2). Rotating the tiller arm 25 of FIG. 1 in a counterclockwise direction with respect to the central axis of rotation 500 causes the steered tire 70 to rotate in the counterclockwise direction about the vertical axis 75. Whereas the steering wheel 90 of FIG. 7 is rotated in the clockwise direction to cause the steered tire 70 to rotate in the counterclockwise direction. While moving in the forward direction A, the clockwise rotation of the steering wheel 90 results in a clockwise turn (to the right, with the operator facing towards direction A) of the vehicle 10.

Considering a second case of FIG. 10, where the steering control device 20, 120 is located in a second operator position P2 and the vehicle is traveling in a forward direction indicated as direction B (also see FIG. 3). Rotating the tiller arm 25 in a counterclockwise direction with respect to the central axis of rotation 500 causes the steered tire 70 to rotate in the counterclockwise direction about the vertical axis 75. The steering wheel 90 is also rotated in the counterclockwise direction to cause the steered tire 70 to rotate in the counterclockwise direction. While moving in the forward direction B, the counterclockwise rotation of the steering wheel 90 results in a counterclockwise turn (to the left, with the operator facing towards direction B) of the vehicle 10.

By configuring the multiple-position steering control device 120 with a steering wheel 90 that has an opposite rotational steering sense in the first operator position P1 as compared with the second operator position P2, the steering wheel 90 performs similarly to an automotive steering system regardless of the operator position.

Other steering control devices may similarly be implemented to provide functionality and operation of a vehicle as described herein. For example, a scooter or motorcycle type steering control may be provided on the mounting structure 60 of FIG. 1 or 7 that may be rotated in multiple positions. The scooter control may not include a pivoting or rotating tiller arm 25, but may operate to control a steering direction of the vehicle 10 in a similar manner as the steering control device 20. Other directional or steering control devices include joysticks, levers, or other controls may similarly be understood as being operable according to the present specification.

The system and apparatus described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A steering system, comprising:
a steering control device configured for access from a first operator position; and
a steering control mount that supports the steering control device, wherein the steering control device is configured to rotate about the steering control mount and to provide steering control from a second operator position opposite the first operator position, and wherein the steering control device provides an opposite rotational steering sense in the first operator position as compared with the second operator position.

2. The steering system of claim 1, wherein the steering control device comprises a steering wheel that is mounted to the steering control mount.

3. The steering system of claim 2, wherein the steering control device is configured to turn a steered tire in a same rotational direction as a steering wheel when the position of the steering control device is detected in the second operating position, and wherein the steering control device is configured to turn the steered tire in an opposite rotational direction as the steering wheel when the position of the steering control is detected in the first operating position.

4. The steering system of claim 3, wherein rotating the steering wheel located in the second operating position in a clockwise direction results in the steered tire being turned clockwise about a vertical axis, and wherein rotating the steering wheel located in the first operating position in the clockwise direction results in the steered tire being turned counterclockwise about the vertical axis.

5. The steering system of claim 1, wherein the first operator position is located outside of a vehicle operator compartment, and wherein the second operator position is located within the vehicle operator compartment.

6. The steering system of claim 1, wherein the first operator position is associated with an operator being located in a first location on a vehicle, and wherein the second operator position is associated with the operator being located in a second location on the vehicle.

7. The steering system of claim 6, wherein the first location is on an opposite side of the steering control mount as the second location.

8. The steering system of claim 1, wherein a maximum vehicle travel speed varies according to whether the steering control device is rotated for operation in the first operator position or the second operator position.

9. The steering system of claim 1, wherein the steering control mount comprises a steering wheel operable from the first operator position, and wherein the steering wheel is further operable from the second operator position located on an opposite side of the steering control mount as the first operator position.

10. An apparatus, comprising:
   means for detecting a position of a steering control that is configured to provide a steering function of a vehicle in either of a first operating position or a second operating position, where the first operating position is oriented opposite that of the second operating position;
   means for receiving a steering request;
   means for steering a vehicle in a first rotational steering sense, in response to receiving the steering request, when the steering control is located in the first operating position; and
   means for steering the vehicle in a second rotational steering sense, in response to receiving the steering request, when the steering control is located in the second operating position, wherein the second rotational steering sense is opposite the first rotational steering sense.

11. The apparatus of claim 10, further comprising means for limiting the vehicle to a different maximum travel speed that varies according to the detected position of the steering control.

12. The apparatus of claim 10, wherein the first operating position is associated with an operator walking behind or in front of the vehicle.

13. The apparatus of claim 12, wherein the second operating position is associated with the operator riding on the vehicle.

14. The apparatus of claim 10, wherein the first operating position is located at one end of the vehicle and is associated with a forward direction of travel facing the vehicle, and wherein the second operating position is associated with a reverse direction of travel facing the first operating position.

15. The apparatus of claim 10, wherein the first and second operating positions are substantially aligned along a longitudinal centerline of the vehicle.

16. The apparatus of claim 10, wherein said means for steering a vehicle in a first rotational steering sense comprise means for turning a steered tire in a same rotational direction as a steering wheel when the position of the steering control device is detected in the second operating position, and wherein said means for steering the vehicle in a second rotational steering sense comprises means for turning the steered tire in an opposite rotational direction as the steering wheel when the position of the steering control is detected in the first operating position.

17. The apparatus of claim 10, wherein the steering control comprises a steering wheel attached to a steering control mount, and wherein the steering wheel is configured to rotate between the first operating position and the second operating position.

18. A method, comprising:
   detecting a position of a steering control that is configured to provide a steering function of a vehicle in either of a first operating position or a second operating position, where the first operating position is oriented opposite that of the second operating position;
   receiving a steering request;
   steering a vehicle in a first rotational steering sense, in response to receiving the steering request, when the steering control is located in the first operating position; and
   steering the vehicle in a second rotational steering sense, in response to receiving the steering request, when the steering control is located in the second operating position, wherein the second rotational steering sense is opposite the first rotational steering sense.

19. The method of claim 18, wherein the steering control is attached to a steering control mount, and wherein the steering control is configured to rotate between the first operating position and the second operating position.

20. The method of claim 19, wherein the steering control mount comprises a steering wheel operable from the first operating position, and wherein the steering wheel is further operable from the second operating position located on an opposite side of the steering control mount as the first operating position.

* * * * *